United States Patent Office 3,530,193
Patented Sept. 22, 1970

3,530,193
CHLOROCYCLOHEXADIENONES
AS METAL SCAVENGERS
William H. Starnes, Jr., Baytown, Tex., assignor to Esso Research and Engineering Company
Filed July 1, 1968, Ser. No. 741,745
Int. Cl. C07c 7/08, 7/18; B01j 1/16
U.S. Cl. 260—666.5                 9 Claims

ABSTRACT OF THE DISCLOSURE

Certain chlorocyclohexadienones have been found to be effective metal scavengers and useful in an inhibitor system for preventing the metal catalyzed autoxidation of organic substrates.

BACKGROUND OF THE INVENTION

During manufacture, storage, or end-use applications, many hydrocarbon products become contaminated with metal ions. Certain metal ions are catalysts for autoxidation. Heretofore metal catalyzed autoxidation has ordinarily been prevented by the addition of a combination of inhibitors such as chelating agents (as metal scavengers), hindered phenols (as free radical chain stoppers), trivalent phosphorus compounds (as peroxide decomposers), and the like.

The present invention is directed to the finding that certain chlorocyclohexadienones are effective as metal scavengers in preventing the metal catalyzed autoxidation of organic substrates.

SUMMARY OF THE INVENTION

The present invention may be briefly described as a novel inhibitor system for preventing the metal catalyzed autoxidation of organic substrates which utilizes a chlorocyclohexadienone of the following formulae:

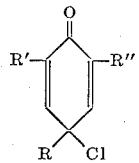 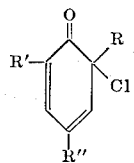

where

R' and R" are alkyl groups having 1 to 10 carbon atoms,
R is either an alkyl group having 1 to 10 carbon atoms or a group having Structure I or Structure II,

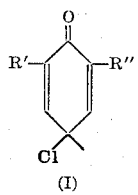 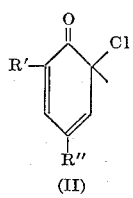

(I)           (II)

More particularly, the present invention is directed to an inhibitor system which comprises a chlorocyclohexadienone and a phenol. The combination of the chlorocyclohexadienone and phenol produces a synergistic inhibitor system which is capable of preventing autoxidation substantially indefinitely.

DESCRIPTION OF THE PREFERRED EMBODIMENT

Figure 2:
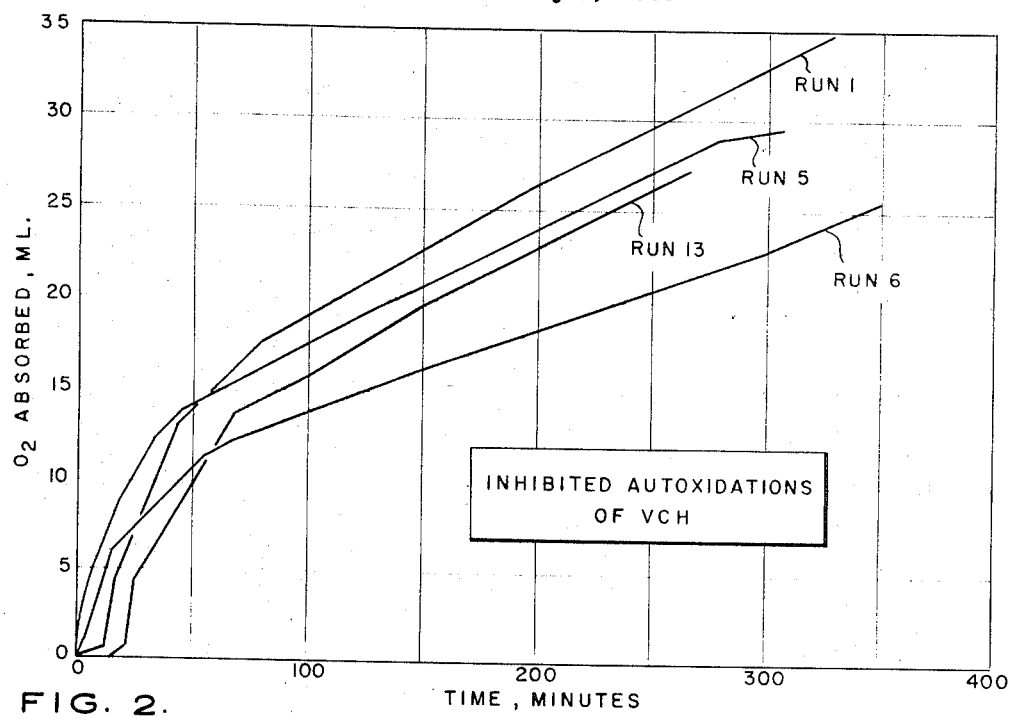
FIG. 2 is a chart showing the oxygen absorption as to time or oxidation rates in the autoxidation of 4-vinylcyclohexene.

Organic substrates, both liquid and solid, may become contaminated with metal ions which catalyze autoxidation. In the storage of liquid organic products such as aromatics or olefins, the metal ion is most likely to come from the metallic storage vessel. Occasionally the metal ion is present due to its use in processing. Solid organic products likewise may be contaminated with metal ions. An example of such solid products are the polyolefin polymers produced using a Ziegler polymerization catalyst in a manner well known to the art. Thus, solid organic substrates may be suitably exemplified by polyethylene, polypropylene, polybutene-1, ethylene-propylene copolymers and the like, which are solid polymers having molecular weights in the range from about 10,000 to 1,000,000 or more. Thus, the present invention is applicable to any organic substrate which is autoxidizable due to the presence of metal ions which catalyze autoxidation. Metals such as titanium, vanadium, chromium, manganese, iron, cobalt, nickel, copper, molybdenum, tungsten, and lead act as catalysts in the autoxidation of organic substrates.

The chlorocyclohexadienones which may be added to organic substrates containing such metals have the following formulae:

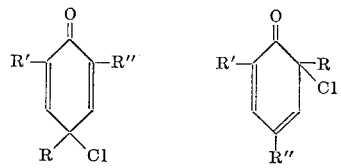

where

R' and R" are alkyl groups having 1 to 10 carbon atoms,
R is either an alkyl group having 1 to 10 carbon atoms or a group having Structure I or Structure II Specific chlorocyclohexadienones are 6-chloro-2,6-di-t-butyl-4-methyl-2,4-cyclohexadien-1-one, 4-chloro-2,6-di-t-butyl-4-methyl-2,5-cyclohexadien-1-one, and 3,3',5,5'-tetra-t-butyl-1,1'-dichloro - [bis-2,5-cyclohexadien-1-yl]-4,4'-dione. The chlorocyclohexadienones of the present invention are preferably added to the organic substrates as metal scavengers in amounts which are at least stoichiometrically equal to the amount of metal present in the substrate. It has been found that the intermediates produced in the scavenging reactions of the chlorocyclohexadienones act as free radical chain stoppers. Accordingly, the chlorocyclohexadienones are effective antioxidants when used alone.

The chlorocyclohexadienones may also be used together with a stabilizing amount of a phenol to produce a synergistic inhibitor system. Suitable phenols may be exemplified by phenol, o-cresol, p-cresol, m-cresol, hydroquinone, and 2,6-di-t-butyl-4-methylphenol; bisphenols such as 4,4'-methylenebis(2,6-di-t-butylphenol) and 2,2', 6,6'-tetra-t-butyl-p,p'-bisphenol; and trisphenols such as 1,1,3-tris(2-methyl-5-t-butyl-4-hydroxyphenyl)butane and 1,3,5-tris(3,5-di-t-butyl-4-hydroxybenzyl) - 2,4,6 - trimethylbenzene. The phenols may be present in an amount from about 0.01 to about 1.5 percent by weight.

The chlorocyclohexadienones may be easily prepared by chlorinating common phenolic compounds having no vacant ortho or para positions. The oxidation of 4-chlorophenols containing bulky ortho substituents results in excellent yields of the bischlorocyclohexadienones such as 3,3'-5,5'-tetra-t-butyl-1,1' - dichloro - [bis-2,5-cyclohexadien-1-yl]-4,4'-dione.

The invention will be further illustrated by the following specific examples which are given by way of illus-

EXAMPLE 1

Preparation of 4-chloro-2,6-di-t-butyl-4-methyl-2,5-cyclohexadien-1-one—Compound A A mixture of 2,6-di-t-butyl-4-methylphenol (50.0 g., 0.227 mole), glacial acetic acid (100 ml.), and methanol (100 ml.) was cooled to −12° C. and stirred while slightly more than one equivalent of chlorine gas was introduced. The temperature rose to −10° C. during the addition, which required 3 minutes, and a considerable amount of solid separated. The mixture was filtered immediately, and the recovered solid was washed twice with Dry Ice chilled methanol. After air drying in a refrigerator for several days, the product (28.0 g.) melted at 90–95° C. Two additional crops, M.P. 91–95° C. (6.0 g.) and 88–91° C. (6.7 g.), precipitated when the cold mother liquor was concentrated in vacuo; these were recovered in a similar manner. All three crops were combined and recrystallized from cold petroleum ether (B.P. 30–60° C.) to give 21.9 g. (38% yield) of Compound A as cream-colored needles, M.P. 100–101.5° C. The structure of the product was confirmed by an N.M.R. spectrum (in CDCl₃), which showed sharp singlets at τ8.74 (18 H, t-butyl groups), 8.23 (3 H, 4-methyl group), and 3.42 (2 H, ring protons).

EXAMPLE 2

Preparation of 3,3′,5,5′-tetra-t-butyl-1,1′-dichloro-[bis-2,5-cyclohexadien-1-yl]-4,4′-dione—Compound B A solution of 2,6-di-t-butyl-4-chlorophenol (10.0 g., 0.0415 mole) in benzene (50 ml.) was prepared in an indented flask and thoroughly degassed by stirring rapidly and bubbling with nitrogen for several minutes. Rapid stirring under nitrogen was continued while a similarly degassed solution of potassium ferricyanide (25 g., 0.076 mole) and potassium hydroxide (5 g.) in water (200 ml.) was added. After an additional 30 minutes of rapid stirring under nitrogen, the two layers of the mixture were separated, and the benzene layer was dried over Drierite. Evaporation of the dried solution at room temperature under vacuum gave 10.0 g. (100% yield) of Compound B as pale yellow crystals, M.P. 156–157° C. The structure of the product was confirmed by infrared and N.M.R. spectra. Recrystallization from dry acetone raised the melting point to 166–167.5° C. but caused no detectable spectral changes.

The foregoing examples illustrate the preparation of the chlorocyclohexadienones which may be used as autoxidation inhibitors in organic substrates according to the present invention. The dramatic effect of the cyclohexadienones as inhibitors for preventing the metal catalyzed autoxidation of hydrocarbons is illustrated by measurements of the time required for the initiation of oxidation (i.e., the induction period) in two illustrative hydrocarbon systems, and by measurements of oxidation rates in these systems. The two systems utilized 4-vinylcyclohexene and cumene as representative of olefins and aromatics, respectively. The metals used were cobalt and manganese, since these are known to be the most highly catalytic metals for the promotion of oxidative degradation. The results of the tests are set forth in Table I and FIGS. 1 and 2.

TABLE I.—INHIBITED AUTOXIDATIONS OF 4-VINYLCYCLOHEXENE (VCH) AND CUMENE [a]

Figure 1:
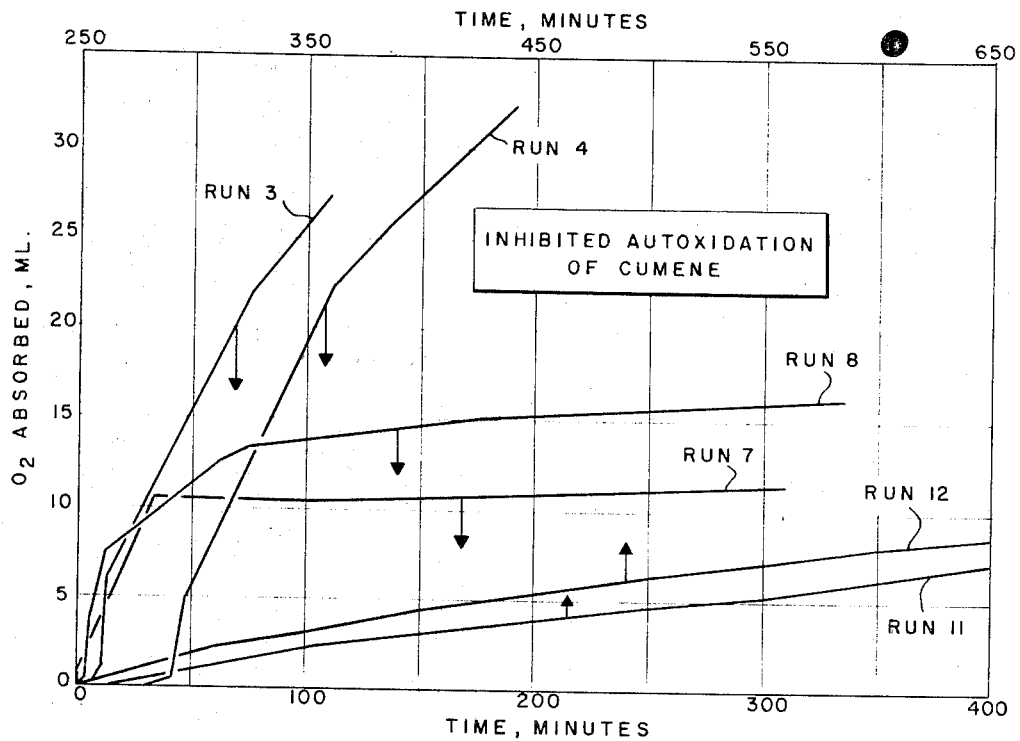
FIG. 1 is a chart showing the oxygen absorption as to time or oxidation rates in the autoxidation of cumene.

| Run No. | Substrate (volume percent in PhH) | Metal [b] (gram-atom×10⁷) | Chlorodienone (moles×10⁵) | Ionol, moles×10⁵ | Induction period, hr. | Comments |
|---|---|---|---|---|---|---|
| 1 | VCH (82) | Co (2.0) | | 2.27 | 0.2±0.05 [c] | See FIG. 2. |
| 2 | VCH (82) | Mn (2.2) | | 2.27 | 2.5–4.2 | |
| 3 | Cumene (82) | Co (2.0) | | 2.27 | 0.2±0.1 [d] | See FIG. 1. |
| 4 | Cumene (82) | Mn (2.2) | | 2.27 | 0.6±0.1 [e] | See FIG. 1. |
| 5 | VCH (82) | Co (2.0) | A (2.27) | | 0, 0 | See FIG. 2. |
| 6 | VCH (70) | Co (2.0) | A (6.81) | | 0, 0 | See FIG. 2. |
| 7 | Cumene (82) | Co (2.0) | A (2.27) | | 0 | See FIG. 1. |
| 8 | Cumene (82) | Mn (2.2) | A (2.27) | | 0 | See FIG. 1. |
| 9 | VCH (82) | Co (2.0) | B (1.14) | | 5.2–10.8, 6.6–12.8 | |
| 10 | VCH (82) | Mn (2.2) | B (1.14) | | 6.8–16.0, 4.3–10.1 | |
| 11 | Cumene (82) | Co (2.0) | B (1.14) | | 4.1–7.7, 4.2–5.9 | See FIG. 1. |
| 12 | Cumene (82) | Mn (2.2) | B (1.14) | | 4.1–5.1 | See FIG. 1. |
| 13 | VCH (76) | Co (2.0) | A (2.27) | 2.27 | 0.25±0.05 [e] | See FIG. 2. |
| 14 | VCH (66) | Co (2.0) | A (6.81) | 2.27 | >33.0 [f], >21.3 | |
| 15 | VCH (76) | Mn (2.2) | A (2.27) | 2.27 | >22.5, >19.8 | |
| 16 | VCH (76) | Co (2.0) | B (1.14) | 2.27 | >19.5 | |
| 17 | Cumene (76) | Co (2.0) | B (1.14) | 2.27 | >70.6, >19.9 | |
| 18 | VCH (76) | Mn (2.2) | B (1.14) | 2.27 | >21.3 | |

[a] 50° C., pure O₂ at 1 atm. total pressure (including vapor pressure of reaction mixture), 2.64×10⁻⁴ mole t-butyl hydroperoxide.
[b] Cobalt or manganese naphthenate.
[c] Average of three runs.
[d] Average of six runs.
[e] Average of two runs.
[f] In this run only ca. 0.5% oxidation (∼ 5 ml. O₂ absorbed) occurred during 67.8 hr.

Runs 1–4 are control runs using Ionol (2,6-di-t-butyl-4-methylphenol), a typical phenolic antioxidant. In runs 5–8 Compound A gave no measurable induction period when used alone (see Table I); however, FIGS. 1 and 2 show that Compound A greatly reduced the rate of oxygen absorption in these experiments, as compared to the appropriate control runs. When used alone (runs 9–12), Compound B gave a much longer induction period than was observed with Ionol (see Table I) and also reduced the rate of oxygen uptake (see FIG. 1). Mixtures of Ionol with A or B (runs 13–18) showed a very strong synergistic effect, either in reducing the rate of oxidation (run 13; see FIG. 2) or in greatly increasing the induction period (runs 14–18; see Table I). Further studies showed that other chlorocyclohexadienones falling within the scope of the present invention had antioxidant properties analogous to those of Compounds A and B.

The nature of the objects of the present invention having been completely described and illustrated, what I wish to claim as new and useful and secure by Letters Patent is:

1. A composition which comprises:
an autoxidizable organic substrate containing a metal which acts as an autoxidation catalyst, and
a chlorocyclohexadienone having one of the following formulae:

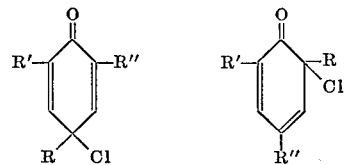

where
R′ and R″ are alkyl groups having 1 to 10 carbon atoms,
R is either an alkyl group having 1 to 10 carbon atoms or a group having Structure I or Structure II,

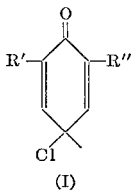 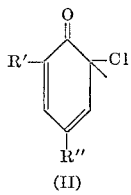
(I)                   (II)

2. A composition according to claim 1 wherein the chlorocyclohexadienone is present in at least a stoichiometric amount equal to the amount of metal present.

3. A composition according to claim 1 wherein said substrate contains a metal ion selected from the group consisting of titanium, vanadium, chromium, manganese, iron, cobalt, nickel, copper, molybdenum, tungsten and lead.

4. A composition according to claim 3 wherein the chlorocyclohexadienone is present in at least a stoichiometric amount equal to the amount of metal present.

5. A composition according to claim 4 wherein said organic substrate is an olefinic hydrocarbon.

6. A composition according to claim 4 wherein said organic substrate is an alkylaromatic hydrocarbon.

7. A composition according to claim 1 which contains in addition a stabilizing amount of a phenol.

8. A composition according to claim 4 which contains in addition a stabilizing amount of a phenol.

9. A composition according to claim 2 which contains between 0.01 and 1.5 percent by weight of a phenol.

References Cited

UNITED STATES PATENTS 3,265,659  8/1966   Kobayashi _____ 260—666.5 X
3,406,218  10/1968  Da Rooge et al. ____ 260—666.5
3,410,878  11/1968  Becker _____ 260—669

DELBERT E. GANTZ, Primary Examiner

G. E. SCHMITKONS, Assistant Examiner

U.S. Cl. X.R.

203—9; 252—404